(12) United States Patent
Zimmanck et al.

(10) Patent No.: US 10,126,721 B2
(45) Date of Patent: Nov. 13, 2018

(54) METHOD AND APPARATUS FOR ACTIVATION AND DE-ACTIVATION OF POWER CONDITIONERS IN DISTRIBUTED RESOURCE ISLAND SYSTEMS USING LOW VOLTAGE AC

(71) Applicant: Enphase Energy, Inc., Petaluma, CA (US)

(72) Inventors: Donald Richard Zimmanck, Petaluma, CA (US); Christopher N. Rowe, Petaluma, CA (US); John Scott Berdner, Grass Valley, CA (US)

(73) Assignee: Enphase Energy, Inc., Petaluma, CA (US)

( * ) Notice: Subject to any disclaimer, the term of this patent is extended or adjusted under 35 U.S.C. 154(b) by 287 days.

(21) Appl. No.: 15/047,337

(22) Filed: Feb. 18, 2016

(65) Prior Publication Data
US 2016/0241032 A1 Aug. 18, 2016

Related U.S. Application Data

(60) Provisional application No. 62/117,543, filed on Feb. 18, 2015, provisional application No. 62/255,782, filed on Nov. 16, 2015.

(51) Int. Cl.
*H02J 3/00* (2006.01)
*G05B 15/02* (2006.01)
*H02J 3/14* (2006.01)

(52) U.S. Cl.
CPC ............... *G05B 15/02* (2013.01); *H02J 3/14* (2013.01); *Y02B 70/3225* (2013.01); *Y04S 20/222* (2013.01)

(58) Field of Classification Search
CPC ... Y02B 70/3225; Y04S 20/222; G05B 15/02; H02J 3/14; H02P 1/46
See application file for complete search history.

(56) References Cited

U.S. PATENT DOCUMENTS

2004/0008010 A1 * 1/2004 Ebrahim ................ H02P 9/04
322/44
2005/0052029 A1 3/2005 Aldridge et al.
(Continued)

FOREIGN PATENT DOCUMENTS

WO WO-2013091675 A1 6/2013

OTHER PUBLICATIONS

International Search Report and Written Opinion dated May 24, 2016 for PCT Application No. PCT/US2016/018519, 10 pgs.
(Continued)

*Primary Examiner* — Changhyun Yi
(74) *Attorney, Agent, or Firm* — Moser Taboada

(57) ABSTRACT

Methods and apparatus for controlling power conditioners in a distributed resource island are provided herein. In one embodiment, an input of a power conditioner that is operating in a de-energized state and coupled to an islanded grid is compared to an input threshold. When the input exceeds the input threshold, the power conditioner is operated in a soft-grid mode to generate a touch-safe AC voltage that is coupled to the islanded grid. The power conditioner compares an impedance of the islanded grid to a grid impedance range and compares load demand of the power conditioner to an activate threshold; when the impedance is within the grid impedance range and the load demand exceeds the activate threshold, the power conditioner is activated to operate proximate its nominal output voltage.

18 Claims, 4 Drawing Sheets

(56) References Cited

U.S. PATENT DOCUMENTS

| | | | |
|---|---|---|---|
| 2005/0206167 A1 | 9/2005 | Gehret | |
| 2009/0160259 A1* | 6/2009 | Naiknaware | H02M 7/4807 |
| | | | 307/82 |
| 2012/0126623 A1* | 5/2012 | Koehl | H02J 3/383 |
| | | | 307/76 |
| 2012/0267952 A1* | 10/2012 | Ballatine | H02J 1/102 |
| | | | 307/26 |
| 2013/0221877 A1 | 8/2013 | Marken | |
| 2014/0018969 A1 | 1/2014 | Forbes | |
| 2014/0306543 A1* | 10/2014 | Garrity | H02M 7/44 |
| | | | 307/82 |
| 2015/0260161 A1* | 9/2015 | Son | F03D 7/06 |
| | | | 290/44 |

OTHER PUBLICATIONS

K. De Brabandere et al., "Control of Microgrids", IEEE Xplore, 8 pgs., Jun. 24-28, 2007.

* cited by examiner

METHOD AND APPARATUS FOR ACTIVATION AND DE-ACTIVATION OF POWER CONDITIONERS IN DISTRIBUTED RESOURCE ISLAND SYSTEMS USING LOW VOLTAGE AC

CROSS-REFERENCE TO RELATED APPLICATIONS

This application claims benefit of U.S. provisional patent application Ser. No. 62/117,543 entitled "Black-Start of Distributed Resource Island System Using Low Voltage AC" and filed Feb. 18, 2015, and U.S. provisional patent application Ser. No. 62/255,782 entitled "Activation and De-activation of Inverters In Distributed Resource Island Systems Using Low Voltage AC" and filed Nov. 16, 2015. Each of the aforementioned patent applications is herein incorporated in its entirety by reference.

BACKGROUND OF THE INVENTION

Field of the Invention

Embodiments of the present disclosure relate generally to distributed power generation systems and, more particularly, to a black-start of a distributed power generation system.

Description of the Related Art

In an Electric Power System (EPS), a black-start is the process of restoring power after an outage. In the case of a distributed resource island system, coordination is required between distributed energy resources (DERs) and a central controller. In a microgrid, a microgrid interconnect device (MID) is used for disconnecting (i.e., islanding) the system from the main grid or a larger microgrid. The central controller (which is the role of the MID) ensures that the island system is disconnected from the main grid or larger microgrid prior to black-start in order to prevent danger to line-workers. In addition, distributed energy resources need to receive a central command from a controller in order to prevent unwanted energization; for example, during installation or maintenance operations.

During a power outage, the central controller loses access to AC power and requires some form of energy storage or generation source, such as a super-capacitor, battery, or generator, to stay powered. However, such components undesirably add to overall system cost and adversely impact the system reliability.

Therefore, there is a need in the art for efficiently controlling power conditioner activation and de-activation in a distributed resource island system (DRIS).

SUMMARY OF THE INVENTION

Embodiments of the present invention generally relate to a method and apparatus for controlling power conditioners in a distributed resource island system substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
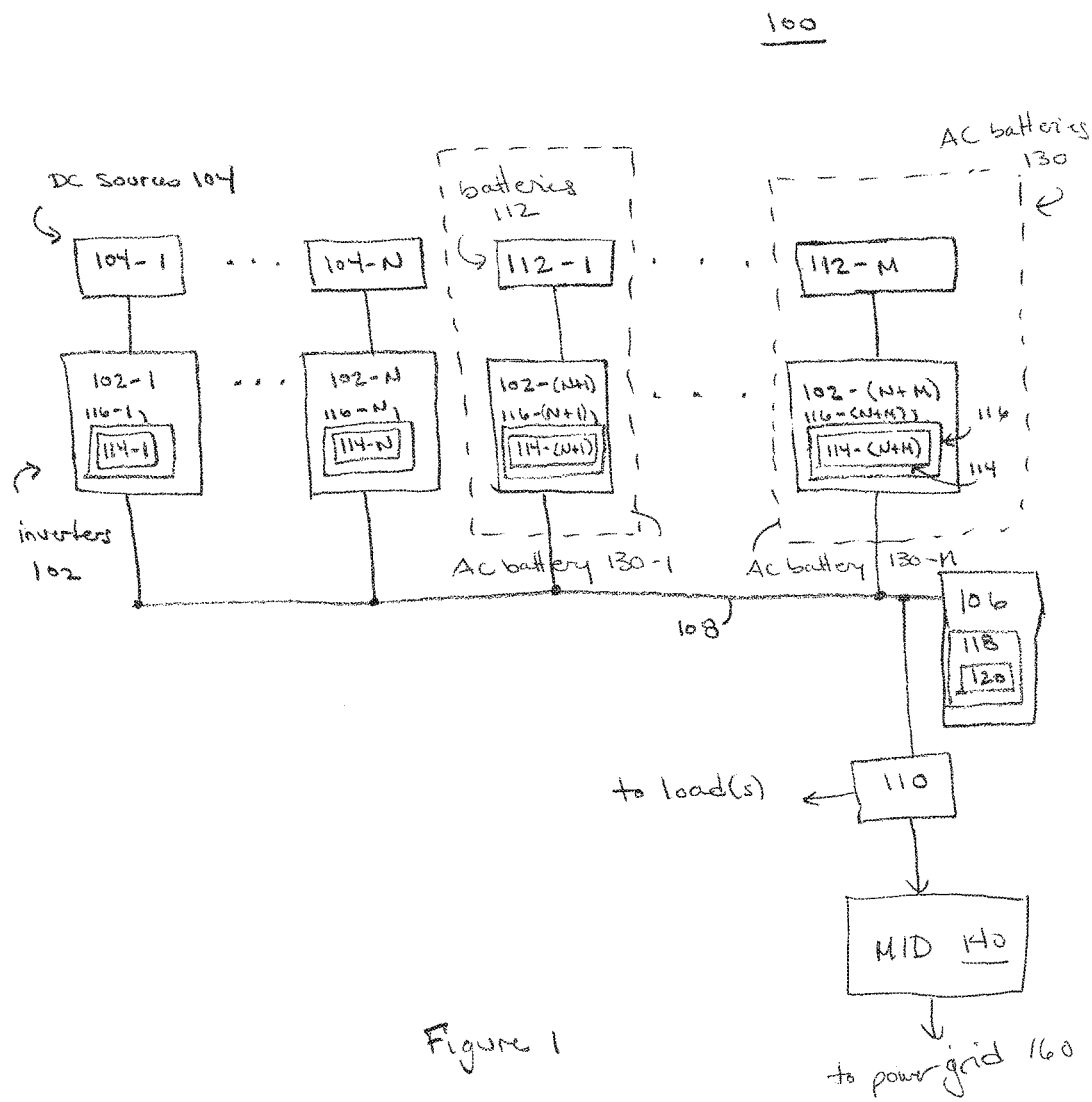
FIG. 1 is a block diagram of a system for power conversion using one or more embodiments of the present invention.

FIG. 1 is a block diagram of a system 100 for power conversion using one or more embodiments of the present invention. This diagram only portrays one variation of the myriad of possible system configurations and devices that may utilize the present invention.

The system 100, which may also be referred to as a microgrid or a distributed resource island system (DRIS), is a distributed power generation system that comprises a plurality of power conditioners 102-1, . . . 102-N, . . . 102-N+M, collectively referred to as power conditioners 102; a plurality of DC power sources 104-1 . . . 104-N, collectively referred to as DC power sources 104; a plurality of energy storage/delivery devices (e.g., batteries) 112-1 . . . 112-M, collectively referred to as energy storage/delivery devices 112; a system controller 106; a bus 108; and a load center 110. The DC power sources 104 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power. In some embodiments, such as the embodiments described with respect to FIG. 1, the DC sources 104 are PV modules and are referred to as "PV modules 104". Although the energy storage/delivery devices 112 may be any suitable device that can store energy and deliver the stored energy for use (e.g., batteries, hydroelectric dams, or the like), in the embodiments described herein with respect to FIG. 1 the energy storage/delivery devices 112 are batteries and are referred to herein as "batteries 112".

The power conditioners 102 are bi-directional DC:AC inverters, although in other embodiments the power conditioners 102 may be other types of power converters (e.g. AC-AC matrix converters).

Each power conditioner 102-1 . . . 102-N is coupled to a PV module 104-1 . . . 104-N, respectively, in a one-to-one correspondence, although in some other embodiments multiple PV modules 104 may be coupled to one or more of the power conditioners 102. Each power conditioner 102-(N+1) . . . 102-(N+M) is coupled to a battery 112-1 . . . 112-(M), respectively, in a one-to-one correspondence, where each pairing of a power conditioner 102 and a battery 112 forms an "AC battery" 130 (e.g., the battery 112-1 and the power conditioner 102-(N+1) form the AC battery 130-1, and the battery 112-M and the power conditioner 102-(N+M) form the AC battery 130-M). The power conditioners 102 are coupled to the system controller 106 via the bus 108; the bus 108 is further coupled to one or more loads and a power grid 160 (e.g., a commercial grid, or more other microgrids, or the like) via the load center 110.

When the system 100 is operating in a normal mode (i.e., while connected to the power grid 160) and the system controller 106 is receiving power on the AC bus 108 to operate, the system controller 106 is capable of communicating with the power conditioners 102 by wireless and/or wired communication (e.g., power line communication (PLC)) for providing operative control and/or monitoring of the power conditioners 102 (e.g., communicating commands to the power conditioners 102, obtaining data regarding the performance of the power conditioners 102, and the like). In some embodiments, the system controller 106 may be a gateway for receiving information from and/or sending information to another device (such as a remote master controller, not pictured) via a communications network, for example via the Internet. In such embodiments, the system controller 106 may communicate information pertaining to the power conditioners 102 (e.g., performance data) to the remote master controller, and/or communicate data from the remote master controller (e.g., control commands) to one or more of the power conditioners 102.

The system 100 further comprises a microgrid interconnect device (MID) 140, which may also be referred to as an island interconnect device (IID), for determining when to disconnect from/connect to the power grid 160, and for performing the disconnection/connection. For example, the MID 140 may detect a grid fluctuation, disturbance or outage and, as a result, disconnect the system 100 from the power grid 160. Once disconnected from the power grid 160, the system 100 can continue to generate power as an intentional island without imposing safety risks on any line workers that may be working on the power grid 160. The MID 140 comprises a disconnect component (e.g., a contactor or the like) for physically disconnecting/connecting the system 100 to the grid or a larger microgrid. In some embodiments, the MID 140 may additionally comprise an autoformer for coupling the balanced power system 100 to a split-phase load that may have a misbalance in it with some neutral current.

In some alternative embodiments, the system controller 106 comprises the MID 140 or a portion of the MID 140. For example, the system controller 106 may comprise an islanding module for monitoring the power grid 160, detecting grid failures and disturbances, determining when to disconnect from/connect to the power grid 160, and driving a disconnect component accordingly, where the disconnect component may be part of the system controller 106 or, alternatively, separate from the system controller 106. In other embodiments, such as the embodiment depicted in FIG. 1, the MID 140 is separate from the system controller 106 and comprises a disconnect component as well as a CPU and an islanding module for monitoring the power grid 160, detecting grid failures and disturbances, determining when to disconnect from/connect to the power grid 160, and driving the disconnect component accordingly. In some embodiments, the MID 140 may coordinate with the system controller 106, e.g., using power line communications. Thus, the disconnection/connection of the system 100 to the power grid 160 is a controlled process driven by the MID 140.

The power conditioners 102-1 . . . 102-N convert the DC power from the PV modules 104 to AC output power and couple the generated output power to the load center 110 via the bus 108. The load center 110 is further coupled to the power 160 grid (e.g., the commercial power grid, a larger microgrid, or the like) as well as to one or more loads (e.g., electrical appliances). The power conditioners 102-(N+1) . . . 102-(N+M) are bidirectional converters that can convert AC from the AC bus 108 to DC and store the resulting energy in the corresponding batteries 112-1) . . . 112-M), and can convert DC from the corresponding batteries 112-1) . . . 112-M) to AC and couple the generated AC output to the AC bus 108. As such, the system 100 can generate AC output power during daylight hours via the PV modules 104, store at least a portion of the generated energy in the batteries 112, and continue to generate AC output during the evening hours using the energy stored in the batteries 112. While connected to the power grid 160, the power conditioners 102 may operate in a "power mode" where the grid voltage is used as a reference voltage for synchronizing the output from the power conditioners 102.

In accordance with one or more embodiments of the present invention, each of the power conditioners 102-1 . . . 102-(N+M) comprises a corresponding controller 116-1 . . . 116-(N+M) having a black-start module 114-1 . . . 116-(N+M) for providing a black-start to start operation of the system 100 when it is islanded and de-energized. The system 100 may be islanded (i.e., not connected to the power grid 160) for a variety of reasons; for example, the MID 140 may disconnect the system 100 from the power grid 160 following a power failure on the power grid 160, a user may manually disconnect the system 100 from the power grid 160 to perform maintenance and/or add components, the system 100 may have been installed and not yet connected to the power grid 160, or the like. In some embodiments, the system 100 may be de-energized when islanded as a result of its load exceeding the system generation capability. In other embodiments, the system 100 may be de-energized when islanded as a result of receiving insufficient input from the sources 104 and 112; for example, in one or more embodiments where the DC sources 104 are PV modules, the system 100 may become de-energized while islanded during the night when the PV modules are not producing any output and if the batteries 112 have insufficient storage to meet the load demand. In still other embodiments, the system 100 may be intentionally de-energized while islanded to conduct routine maintenance or to expand the system 100. Prior to the black-start, one or more loads (such as non-critical loads) may be disconnected from the system 100 as necessary.

While the system 100 is islanded, those power conditioners 102 having sufficient DC input begin initiating a black-start and generate a touch-safe AC voltage (i.e., a low-level AC voltage on the AC bus 108) that allows communication via the power line (if needed) and allows preliminary electrical testing to be performed as needed (for example, monitoring of the islanded grid impedance by the power conditioners 102). In some embodiments, the touch-safe voltage powers the system controller 106 sufficiently for the system controller 106 to coordinate operation of the system 100; in other embodiments, the power conditioners 102 self-initiate start-up and shut-down without requiring external communication as described further below.

When energy is stored in the batteries 112-1 . . . 112-M, their corresponding power conditioners 102-(N+1) . . . 102-(N+M) can receive sufficient power from the batteries 112-1 . . . 112-M for the power conditioner electronics to remain active. Additionally, when the PV modules 104 receive sufficient sunlight, their corresponding power conditioners 102-1 . . . 102-N can receive sufficient power from the PV modules 104 for their power conditioner electronics to remain active. As such, those power conditioners 102 that have sufficient DC input each generate the touch-safe AC voltage that is coupled to the AC bus 108, resulting in a low-voltage AC bus. The touch-safe AC voltage is low enough to pose no safety risk while providing sufficient power for the system controller 106 to restart and issue commands for starting the power conditioners 102 and/or the power conditioners 102 to self-initiate start-up. In some embodiments, the touch-safe voltage may be on the order of 30V peak or less, although in other embodiments the touch-safe voltage may be greater than 30V. In some alternative embodiments, those power conditioners 102 generating the touch-safe voltage may use one or more communication techniques (e.g., power line communications) for communicating with one another.

In one or more embodiments where the system 100 has been de-energized for a long duration, one or more of the batteries 112 may be used in assisting the black-start. In such embodiments, the batteries 112 must first be charged to allow the system black-start. The batteries 112 may be charged at rated current in a soft-grid mode described below. This charging will then allow a minimum state of charge to be reached to allow the black-start; once the system is energized to nominal voltage the batteries 112 can subsequently charge at full power from the corresponding power conditioners 102.

In those embodiments where the system controller 106 initiates system start-up, the system controller 106 remains powered by the touch-safe voltage on the AC bus 108 from one or more of the power conditioners 102 and can determine the state of the system 100 (e.g., whether the system 100 is being installed or serviced and should not be started, or whether the system 100 should restart to operate as a microgrid) and begin coordinating operation of the power conditioners 102 as needed. In some embodiments, the system controller 106 may receive and aggregate information from those power conditioners 102 that are participating in generating the touch-safe voltage for determining the system state. When the system controller 106 determines that the power conditioners 102 should resume operation, the system controller 106 provides the appropriate commands to the power conditioners 102 to begin full-voltage operation. Those power conditioners 102 receiving sufficient input power can then begin to operate the AC bus 108 at a nominal grid voltage, and the system controller 106 can then continue to be powered from the voltage on the AC bus 108.

In some other embodiments, rather than all of the sufficiently-powered power conditioners 102 generating the touch-safe voltage, a subset of those power conditioners 102 receiving sufficient input power are configured to generate the touch-safe voltage. At system restart, a first subset of the sufficiently-powered power conditioners 102 generate the touch-safe voltage which results in a peak value at or below any applicable regulatory limit or shock hazard threshold. For example, in some embodiments the touch-safe voltage in on the order of 30V peak or less. The touch-safe voltage provides sufficient power for the system controller 106 to start, monitor the power grid 160 for restoration of power, and, when safe for the system 100 to operate as a microgrid, provide the commands to the first subset of power conditioners 102 to begin full-voltage operation. The remaining sufficiently-powered power conditioners 102 may be de-activated, for example by de-energization of a contactor (not shown) positioned strategically along AC bus 108.

In those embodiments where the islanded power conditioners 102 self-initiate start-up and shut-down without having to receive any external communication, such as commands from the system controller 106, each power conditioner 102 enters into an "idle" mode (which may also be referred to as "de-energized") when it initially starts-up during which the power conditioner 102 monitors its DC input and its output power is disabled. Upon detecting sufficient DC input (i.e., when the DC input meets or exceeds an input threshold), the power conditioner 102 switches into a "soft-grid" mode where it outputs the touch-safe voltage. The power conditioners 102 monitor their load demand; if the load demand is sufficiently high (e.g., if the amount of power or the amount of current that the power conditioner 102 would need to generate exceeds an activate threshold), the power conditioner 102 ramps-up to generate the required output power and the AC bus 108 is operated at a nominal grid voltage. Generally, the algorithm could be applied to the active output current, the reactive output current or some combination of the two. In certain embodiments, the absolute value of the inverter's required output current may be compared to the activate threshold so that the first power conditioner 102 to start up will engage the remaining power conditioners 102 by pushing their active currents negative. This could also be done with a separate negative current threshold or by monitoring the amplitude of the voltage and starting up when an increase is detected.

The power conditioners 102 continues to operate at or proximate their rated (i.e., nominal) voltage until their load demand drops below a standby threshold; in some embodiments, the power conditioners 102 may compare their required output power or required output current to the standby threshold. When the load demand for a power conditioner 102 drops below the standby threshold (for example, 5% of a power conditioner's rated power), the power conditioner 102 enters a standby mode where it continues to run its controller 116 and monitor the AC bus 108 to determine what power it would be running at if it were active, as well as the state of the islanded grid. If the load demand subsequently rises to or above a re-activate threshold, the power conditioner 102 begins operating again at or proximate its rated (nominal) voltage; if the AC bus 108 drops below a low grid threshold, the power conditioner 102 switches back into its soft-grid mode.

In some embodiments, the activate and re-activate thresholds for the power conditioners 102 may be set to the same value, for example 10% of the power conditioner's rated power, 0.3 amps, or the like, In other embodiments the activate and re-activate thresholds may be set different values.

In those embodiments where the power conditioners 102 self-initiate start-up and shut-down as described herein, commissioning and decommissioning of the system 100 may occur from the load center 110 using breakers and/or switches. For example, by opening a breaker or switch that feeds one or more of the power conditioners 102 (e.g., a branch of the power conditioners 102), those power conditioners 102 will naturally fall beneath their standby thresholds, their outputs will all de-energize, and they will then switch into the soft-grid mode of operation. When a load is subsequently connected to those power conditioners 102 such that their load demand exceeds the re-activate threshold, the power conditioners 102 having sufficient DC input will ramp-up to operate at or proximate their rated (i.e., nominal) voltage. As one example, the commissioning process to start a typical residential system (e.g., the system 100) may include the following steps: (1) start with all breakers at the load center 110 open; (2) close all power conditioner breakers at the load center 110, thereby causing all power conditioners 102 having sufficient DC input to synchronize in their soft-grid modes so there are no hazardous voltages on the AC bus 108; and (3) close all load breakers at the load center 110. Subsequently, the system 100 may be decommissioned by opening all breakers at the load center 110.

Further, by operating the system 100 such that the power conditioners 102 self-initiate start-up and shut-down as described herein, the power conditioners 102 can be rapidly shut-down, without having to rely on any communication to the power conditioners 102, by disconnecting them from the load. For example, when the power conditioners 102 are disconnected from the load through a shunt-trip breaker or other means, they will all drop below standby threshold and as a result will de-activate. When all of the power conditioners 102 are disconnected and shut down, the power conditioners 102 "see" that the there is no longer any voltage on the islanded grid and re-start in the soft-grid mode.

In some embodiments, the power conditioners 102 may require a signal from a central controller (e.g., the MID 140) before they can transition into the 'nominal grid mode'. This signal could be communicated from the central controller by wired (e.g., PLC) and/or wireless techniques. The signal could also be communicated by another device, external to the central controller, such as a 17 Hz tone injection unit.

Additionally, in those embodiments where the power conditioners 102 self-initiate start-up and shut-down as described herein, the system 100 when islanded can operate as a microgrid more efficiently under light load conditions. For example, in one embodiment where the system 100 comprises thirty power conditioners 102 capable of delivering 300 W each, the standby threshold is set to 20% of the maximum power of the power conditioners 102. As the system load drops below 0.2*30*300=1.8 kW, the power conditioners 102 begin to drop below their standby thresholds, but not at exactly the same time. As the first of the power conditioners 102 shuts down, the remaining power conditioners 102 are forced to pick up the load and run at higher powers. Such control naturally deactivates one or more of the power conditioners 102 to keep the active power conditioners 102 over the standby threshold, which can be programmed to maintain a minimum system efficiency. Those power conditioners 102 that standby continue to monitor the islanded grid, run their control (e.g., droop control or the like) to determine what power they would be running at if activated, and, if the islanded grid has not become de-energized, re-activate when they detect their required output power is above the re-activate threshold, for example 25% of their maximum rated power.

In one or more of the embodiments described above, the islanded power conditioners 102 operate in a "voltage control mode" where a droop control technique is employed for parallel operation of the power conditioners 102 without the need for any common control circuitry or communication between the power conditioners 102. One example of such a droop control technique may be found in commonly assigned, U.S. provisional patent application having 62/118, 230 and entitled "Time-domain Droop Control with Integrated Phasor Current Limiting", which is herein incorporated in its entirety by reference.

Once a connection to the power grid 160 has been restored (via the MID 140), the power conditioners 102 may resume operating in the power mode; i.e., the system controller 106, as coordinated with or part of the MID 140, may issue a command to the power conditioners 102 to restart in the power mode. In some embodiments, the power mode may be a subset of the voltage control mode, while in other embodiments it is not.

The invention described herein thus enables a black-start capability that is necessary in the event that a seamless transition between grid-tied operation and non-grid-tied operation of the system 100 cannot occur.

Figure 2:
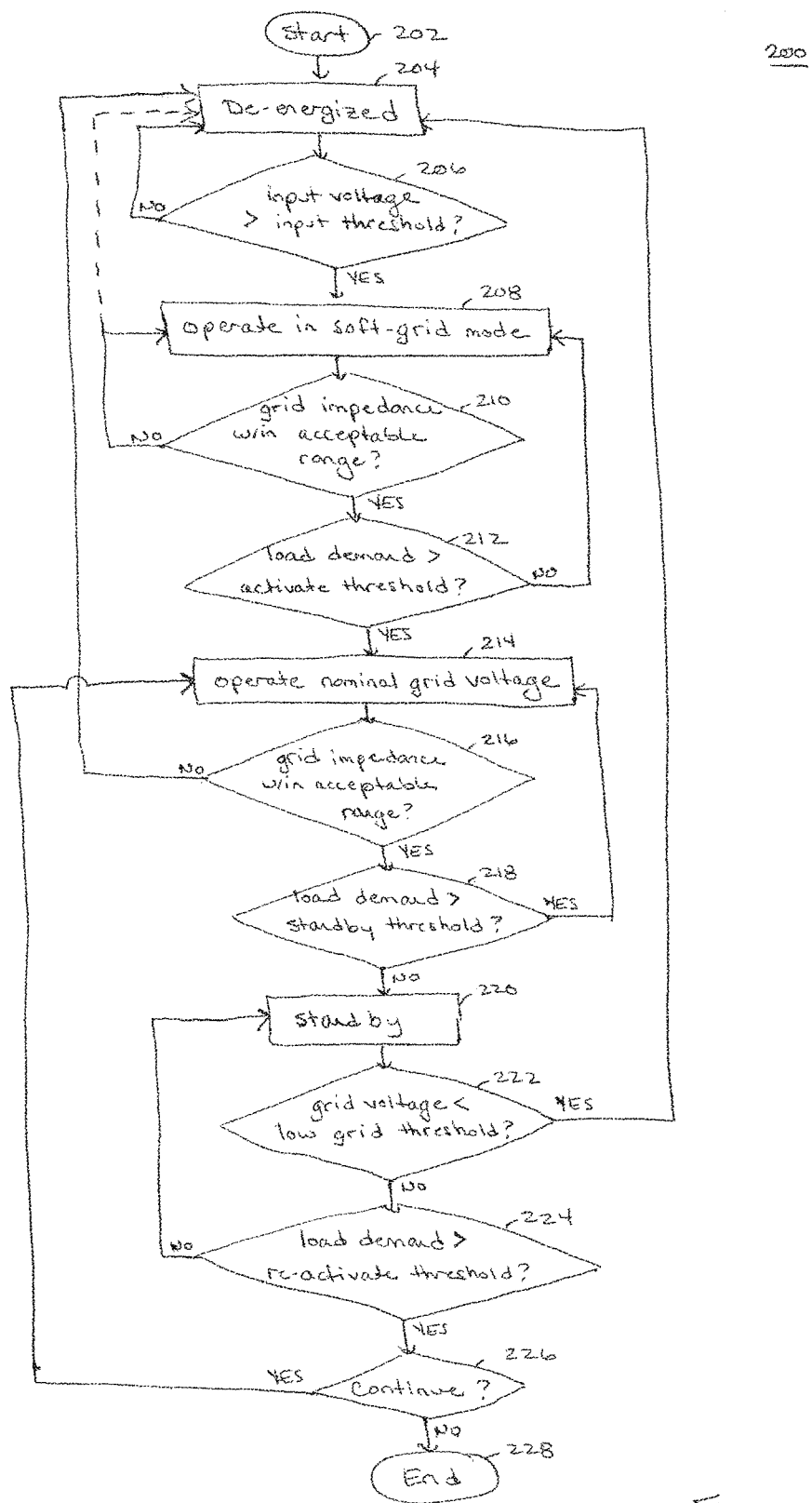
FIG. 2 is a flowchart depicting a method for power conversion employing a black-start capability in accordance with one or more embodiments of the present invention.

FIG. 2 is a flowchart depicting a method 200 for power conversion employing a black-start capability according to one or more embodiments of the present invention. The power conversion is performed by a power conditioner that is part of an islanded microgrid; for example, an MID may island the microgrid after detecting a grid failure, or the microgrid may be completely separate from another power grid (e.g., a commercial power grid or another microgrid) and operate as an independent microgrid. The microgrid comprises a plurality of power conditioners coupled, via an AC bus, to a system controller, a load center, and an MID. The microgrid is further coupled to one or more loads via the load center.

The power conditioner receives input power from an input power source and generates an output power. In some embodiments, the power conditioner may be a bidirectional conditioner that can convert DC-AC and AC-DC. The power conditioner, along with other analogous power conditioner, is coupled to an AC bus that is coupled to one or more loads (e.g., via a load center). In some embodiments, the power conditioner is a power conditioner 102 of the system 100 previously described, and the method 200 is an implementation of the black-start module 114 described further below with respect to FIG. 3. In other embodiments, the microgrid is completely separate from another power grid (e.g., a commercial power grid, another microgrid, or the like) and operates as an independent microgrid.

The method 200 is entered at start block 202 and proceeds to block 204, where the power conditioner is in a de-energized state. In some embodiments, the power conditioner may be de-energized due to the microgrid being de-energized as a result of the local load exceeding the microgrid generation capability. In other embodiments, the microgrid power conditioners may be de-energized as a result of receiving insufficient input from their corresponding power sources. For example, in one or more embodiments where the power sources are PV modules, the microgrid may become de-energized during the night if the microgrid has insufficient storage to meet load demands during the night. In still other embodiments, the microgrid may be intentionally powered-down to conduct routine maintenance or to expand the microgrid (e.g., by adding one or more resources). The method 200 proceeds from step 204 to step 206.

At step 206, a determination is made whether the power conditioner has sufficient input voltage to operate in the soft-grid mode where the touch-safe low voltage output is generated. For example, the power conditioner input voltage may be compared to an input threshold for making the determination. In some embodiments, the power conditioner may be coupled to a PV module that receives enough sunlight during the day to generate a sufficient amount of DC input to the power conditioner but at night does not, or the power conditioner may be coupled to a battery that may or may not have enough stored energy to provide sufficient input voltage to the power conditioner. In some alternative embodiments, the input current and/or the input power to the power conditioner may be evaluated for determining whether to operate in the soft-grid mode.

If the result of the determination at step 206 is no, that there is not sufficient input voltage (e.g., if the input voltage is less than the input threshold), the method 200 returns to step 204. If the result of the determination at step 206 is yes, that there is sufficient input voltage (e.g., if the input voltage meets or exceeds the input threshold), the method 200 proceeds to step 208.

At step 208, the power conditioner operates in a soft-grid mode. In the soft-grid mode, the power conditioner generates a touch-safe voltage and couples the touch-safe voltage to the AC bus. In some embodiments, the touch-safe voltage may be on the order of 30V peak or less; in other embodiments, the touch-safe voltage may be greater than 30V peak.

At step 210, a determination is made whether the grid impedance is within an acceptable range. When the grid impedance is within the acceptable range, the islanded grid is considered to be operable; when the grid impedance is outside of the acceptable range, the islanded grid is considered to be inoperable. The grid impedance as determined by a power conditioner may be compared to a grid impedance range defined by one or more grid impedance thresholds for determining whether the grid impedance is within the acceptable range. For example, the grid impedance may be compared to an upper impedance threshold and to a lower impedance threshold, where the grid impedance is considered to be within the acceptable range when it is between the upper and the lower impedance thresholds.

If the result of the determination is no, that the grid impedance in not within the acceptable range, the method 200 returns to step 208. In one or more embodiments, the grid impedance may be compared to a plurality of grid impedance ranges for determining whether to return to step 208 or, alternately, return to step 204 (as indicated by the dashed line to step 204). For example, the grid impedance may be compared to a first grid impedance range and to a second grid impedance range, where the grid impedance outside of the first range indicates a potential safety hazard with respect to the grid and the power conditioner returns to the de-energized state at step 204, and the grid impedance outside of the second range indicates no potential safety hazard with respect to the grid and the power conditioner returns to the soft-grid mode in step 208.

If the result of the determination at step 210 is yes, the method 200 proceeds to step 212. In some embodiments, the power conditioner may require a signal from a central controller (e.g., an MID) before proceeding to step 212. This signal could be communicated from the central controller by wired (e.g., PLC) and/or wireless techniques. The signal could also be communicated by another device, external to the central controller, such as a 17 Hz tone injection unit At step 212, a determination is made whether the load demand exceeds an activate threshold; for example, the amount of power or the amount of current that the power conditioner would need to generate to meet the load demand is compared to the activate threshold. In some embodiments, the activate threshold may be set at 10% of the power conditioner's rated power; in other embodiments, the activate threshold may be set at 0.3 amps. If the result of the determination is no, the method 200 returns to step 208 and continues to operate in the soft-grid mode. If the result of the determination is yes, the method 200 proceeds to step 214.

At step 214, the power conditioner ramps-up to operate at or proximate its rated (i.e., nominal) voltage such that the islanded grid is operated at a nominal grid voltage. The method 200 proceeds to step 216 where a determination is made whether the grid impedance is within the acceptable range. If the result of the determination is yes, the method 200 proceeds to step 218. If the result of the determination is no, the method 200 returns to step 204 where the power conditioner is in a de-energized state.

At step 218, a determination is made whether the load demand exceeds a standby threshold; for example, the power conditioner may compare its required output power or required output current to the standby threshold to determine whether the load demand exceeds the standby threshold. In some embodiments, the standby threshold may be on the order of 5% of the power conditioner's rated power. If the result of the determination is yes, the method 200 returns to step 214 where the power conditioner continues to operate at its nominal voltage. If the result of the determination is no, the method 200 proceeds to step 220.

At step 220, the power conditioner switches to a standby mode. One or more other power conditioners in the microgrid may, however, remain operating at their nominal voltage based on their load demand.

The method 200 proceeds to step 222 where a determination is made whether the grid voltage is below a low grid threshold; for example, the power conditioner determines the grid voltage and compares it to the low grid threshold. If the result of the determination is yes, the method 220 returns to step 204 where the power conditioner is de-energized. If the result of the determination is no, the method 200 proceeds to step 224.

At step 224 a determination is made whether the load demand exceeds a re-activate threshold; for example, the power conditioner may compare its required output power or required output current to the re-activate threshold to determine whether the load demand exceeds the re-activate threshold. In some embodiments, the activate and re-activate thresholds for the power conditioners 102 may be set to the same value, for example 10% of the power conditioner's rated power, 0.3 amps, or the like. In other embodiments the activate and re-activate thresholds may be set different values. If the result of the determination is no, the method 200 returns to step 220 where the power conditioner remains in the standby mode. If the result of the determination is yes, the method 200 proceeds to step 226, where a determination is made whether to continue. If the result of the determination is yes, the method 200 returns to step 214 where the power conditioner operates at its nominal voltage. If, at step 226, the result of the determination is no, the method 200 proceeds to step 228 where it ends.

Figure 3:
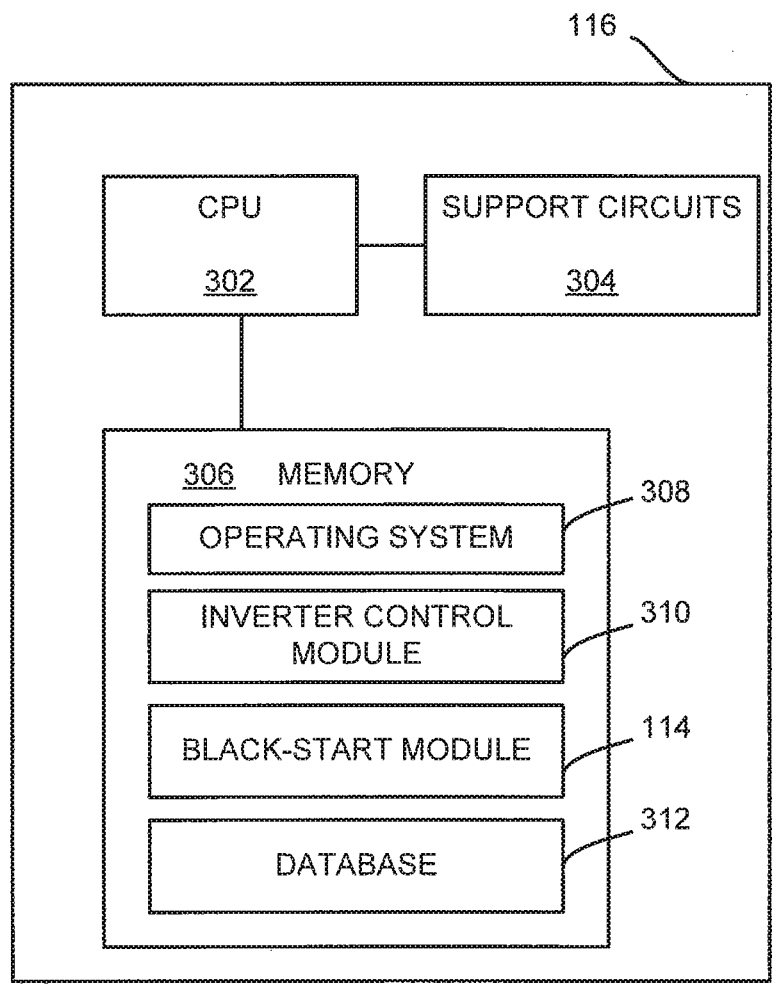
FIG. 3 is a block diagram of a power conditioner controller in accordance with one or more embodiments of the present invention.

FIG. 3 is a block diagram of a power conditioner controller 116 in accordance with one or more embodiments of the present invention. The controller 116 comprises support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The support circuits 304 are well known circuits used to promote functionality of the CPU 302. Such circuits include, but are not limited to, a cache, power supplies, clock circuits, buses, input/output (I/O) circuits, and the like. The controller 116 may be implemented using a general purpose computer that, when executing particular software, becomes a specific purpose computer for performing various embodiments of the present invention. In other embodiments, the CPU 302 may be a microcontroller comprising internal memory for storing controller firmware that, when executed, provides the controller functionality described herein.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS)

308, if necessary, of the controller 116 that can be supported by the CPU capabilities. In some embodiments, the OS 308 may be one of a number of commercially available operating systems such as, but not limited to, LINUX, Real-Time Operating System (RTOS), and the like.

The memory 306 stores various forms of application software, such as an power conditioner control module 310 for controlling operation of the power conditioner 102 (e.g., power conversion (DC-AC conversion and AC-DC conversion), communication, and the like) and a black-start module 114 for controlling the power conditioner black-start functionality as described herein. The memory 306 may additionally store a database 312 for storing data related to the operation of the power conditioner 102 and/or the present invention, such as one or more thresholds described herein.

Figure 4:
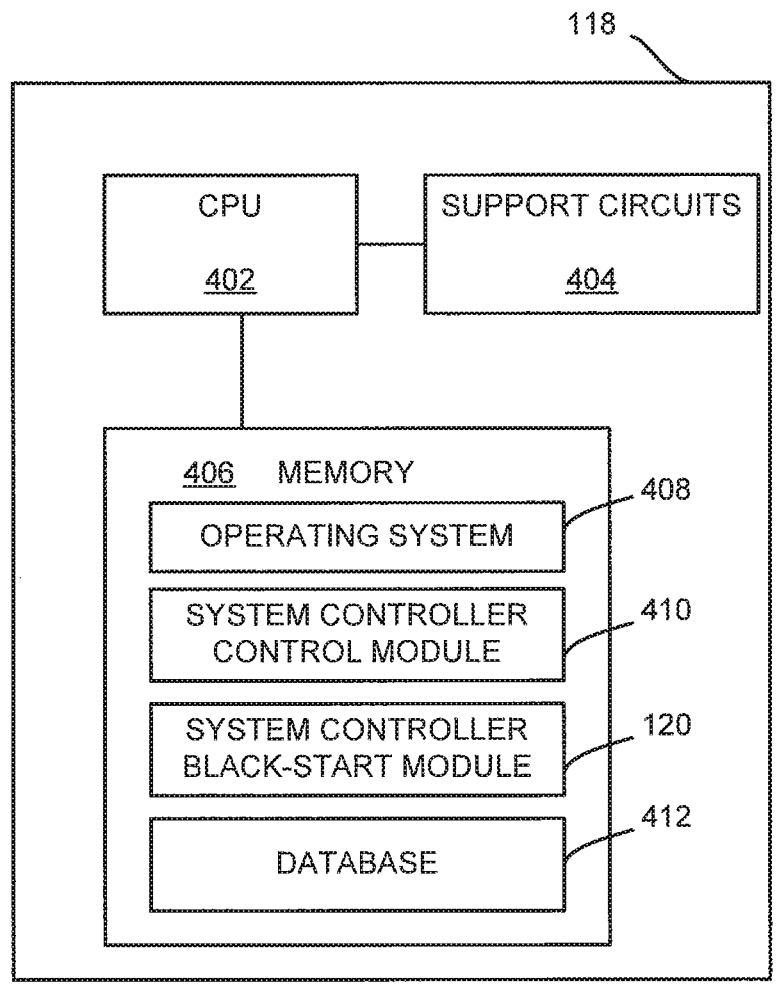
FIG. 4 is a block diagram of a controller for the system controller in accordance with one or more embodiments of the present invention.

FIG. 4 is a block diagram of a controller 118 for the system controller 106 in accordance with one or more embodiments of the present invention. The controller 118 comprises support circuits 404 and a memory 406, each coupled to a central processing unit (CPU) 402. The CPU 402 may comprise one or more conventionally available microprocessors or microcontrollers; alternatively, the CPU 402 may include one or more application specific integrated circuits (ASICs). The support circuits 404 are well known circuits used to promote functionality of the CPU 402. Such circuits include, but are not limited to, a cache, power supplies, clock circuits, buses, input/output (I/O) circuits, and the like. The controller 118 may be implemented using a general purpose computer that, when executing particular software, becomes a specific purpose computer for performing various embodiments of the present invention. In other embodiments, the CPU 402 may be a microcontroller comprising internal memory for storing controller firmware that, when executed, provides the controller functionality described herein.

The memory 406 may comprise random access memory, read only memory, removable disk memory, flash memory, and various combinations of these types of memory. The memory 406 is sometimes referred to as main memory and may, in part, be used as cache memory or buffer memory. The memory 306 generally stores the operating system (OS) 408, if necessary, of the controller 118 that can be supported by the CPU capabilities. In some embodiments, the OS 408 may be one of a number of commercially available operating systems such as, but not limited to, LINUX, Real-Time Operating System (RTOS), and the like.

The memory 406 stores various forms of application software, such as a system controller control module 410 for controlling operation of the system controller 106 and a system controller black-start module 120 for controlling the system controller black-start functionality as described herein. The memory 406 may additionally store a database 412 for storing data related to the operation of the system controller 106 and/or the present invention, such as one or more thresholds described herein.

In certain embodiments, the memory 406 may additionally store an islanding module for monitoring the grid, detecting grid failures and disturbances, determining when to disconnect from/connect to the grid, and driving a disconnect component (e.g., an MID) accordingly, where the disconnect component may be part of the system controller 106 or, alternatively, separate from the system controller 106.

While the foregoing is directed to embodiments of the present invention, other and further embodiments of the invention may be devised without departing from the basic scope thereof, and the scope thereof is defined by the claims that follow.

The invention claimed is:

1. A method for controlling power conditioners in a distributed resource island system (DRIS), comprising:
   comparing, at a power conditioner operating in a de-energized state, an input of the power conditioner to an input threshold, wherein the power conditioner is coupled to an islanded grid;
   operating the power conditioner, when the input exceeds the input threshold, in a soft-grid mode to generate a touch-safe AC voltage that is coupled to the islanded grid;
   comparing, by the power conditioner, an impedance of the islanded grid to a grid impedance range;
   comparing, by the power conditioner, load demand for the power conditioner to an activate threshold; and
   activating the power conditioner, when the impedance is within the grid impedance range and the load demand exceeds the activate threshold, to operate proximate its nominal output voltage,
   wherein the power conditioner is a DC-AC power conditioner.

2. The method of claim 1, further comprising, subsequent to activating the power conditioner, comparing, by the power conditioner, the load demand to a standby threshold; and operating the power conditioner in a standby mode when the load demand is less than the standby threshold.

3. The method of claim 1, further comprising, subsequent to activating the power conditioner, comparing, by the power conditioner, the impedance to the grid impedance range; and switching the power conditioner to a de-energized state when the impedance is outside of the grid impedance range.

4. The method of claim 2, further comprising, subsequent to operating the power conditioner in the standby mode, comparing, by the power conditioner, the load demand to a re-activate threshold; and activating the power conditioner, when the load demand exceeds the re-activate threshold, to operate proximate the nominal output voltage.

5. The method of claim 2, wherein comparing the load demand to the standby threshold comprises comparing a required output current of the power conditioner to the standby threshold.

6. The method of claim 1, wherein the power conditioner is coupled to a photovoltaic (PV) module that provides the input.

7. An apparatus for controlling power conditioners in a distributed resource island system (DRIS), comprising: a power conditioner, coupled to an islanded grid, comprising a black-start module for (i) comparing, while the power conditioner is operating in a de-energized state, an input of the power conditioner to an input threshold; (ii) operating the power conditioner, when the input exceeds the input threshold, in a soft-grid mode to generate a touch-safe AC voltage that is coupled to the islanded grid; (iii) comparing an impedance of the islanded grid to a grid impedance range; (iv) comparing load demand for the power conditioner to an activate threshold; and (v) activating the power conditioner, when the impedance is within the grid impedance range and the load demand exceeds the activate threshold, to operate proximate its nominal output voltage,
   wherein the power conditioner is a DC-AC power conditioner.

8. The apparatus of claim 7, wherein the black-start module further compares, subsequent to activating the power conditioner, the load demand to a standby threshold; and switches the power conditioner to a standby mode when the load demand is less than the standby threshold.

9. The apparatus of claim 7, wherein the black-start module further compares, subsequent to activating the power conditioner, the impedance to the grid impedance range; and switches the power conditioner to a to a de-energized state when the impedance is outside of the grid impedance range.

10. The apparatus of claim 8, wherein the black-start module further compares, subsequent to switching the power conditioner in the standby mode, the load demand to a re-activate threshold; and activates the power conditioner, when the load demand exceeds the re-activate threshold, to operate proximate the nominal output voltage.

11. The apparatus of claim 8, wherein comparing the load demand to the standby threshold comprises comparing a required output current of the power conditioner to the standby threshold.

12. The apparatus of claim 7, wherein the power conditioner is coupled to a photovoltaic (PV) module that provides the input.

13. A system for controlling power conditioners in a distributed resource island system (DRIS), comprising:
a plurality of power sources; and
a plurality of power conditioners, coupled to the plurality of power sources in a one-to-one correspondence and coupled to an islanded grid, wherein each power conditioner of the plurality of power conditioners comprises a black-start module for (i) comparing, while the power conditioner is operating in a de-energized state, an input of the power conditioner to an input threshold; (ii) operating the power conditioner, when the input exceeds the input threshold, in a soft-grid mode to generate a touch-safe AC voltage that is coupled to the islanded grid; (iii) comparing an impedance of the islanded grid to a grid impedance range; (iv) comparing load demand for the power conditioner to an activate threshold; and (v) activating the power conditioner, when the impedance is within the grid impedance range and the load demand exceeds the activate threshold, to operate proximate its nominal output voltage,
wherein the plurality of power conditioners are DC-AC power conditioners.

14. The system of claim 13, wherein the black-start module further compares, subsequent to activating the power conditioner, the load demand to a standby threshold; and switches the power conditioner to a standby mode when the load demand is less than the standby threshold.

15. The system of claim 13, wherein the black-start module further compares, subsequent to activating the power conditioner, the impedance to the grid impedance range; and switches the power conditioner to a to a de-energized state when the impedance is outside of the grid impedance range.

16. The system of claim 14, wherein the black-start module further compares, subsequent to de-activating the power conditioner, the load demand to a re-activate threshold; and activates the power conditioner, when the load demand exceeds the re-activate threshold, to operate proximate the nominal output voltage.

17. The system of claim 14, wherein comparing the load demand to the standby threshold comprises comparing a required output current of the power conditioner to the standby threshold.

18. The system of claim 13, wherein the plurality of power sources are photovoltaic (PV) modules.

* * * * *